United States Patent Office 3,326,821
Patented June 20, 1967

3,326,821
CELLULAR POLYURETHANES FROM ORGANIC ISOCYANATES, HIGH MOLECULAR WEIGHT POLYETHER POLYOLS AND LOWER MOLECULAR WEIGHT HYDROXY CONTAINING OXO BOTTOMS
Joseph M. Lesser, Philadelphia, Pa., assignor to Air Products and Chemicals, Inc., Philadelphia, Pa., a corporation of Delaware
No Drawing. Filed May 27, 1963, Ser. No. 283,584
9 Claims. (Cl. 260—2.5)

The present invention relates to the preparation of urethane polymers and particularly to the utilization of certain relatively low molecular weight hydroxy compounds commonly characterized as "OXO bottoms" in combination with higher molecular weight polyols in polyurethane formulations.

It has been recognized heretofore that urethane polymers prepared by the reaction of polyols and isocyanates, usually in the presence of a catalyst, can be varied in physical properties by varying the functionality and molecular weight of the selected polyols and/or isocyanates. In many instances a combination of polyols or a combination of polyisocyanates has been used to obtain certain copolymerized polyurethanes. In the present instance a hydroxy material consisting of a mixture of hydroxy compounds or potential hydroxy compounds, such as acetals and esters, carrying only the common terminology of "OXO bottoms," "OXO polymers" or "OXO residue" is incorporated into urethane polymers along with higher molecular weight polyols and diisocyanates to form distinctive urethane polymers.

OXO "bottoms," "polymer" or "residue," hereafter called OXO bottoms are produced as byproducts in the OXO process which is directed primarily to the conversion of olefins to primary alcohols. Olefinic hydrocarbons having the formula $C_nH_{2n}$ are reacted, generally in a two stage process, with (a) carbon monoxide and hydrogen in the presence of an organo-cobalt catalyst at pressures of about 2000 to 4000 p.s.i. and temperatures of about 275 to 375° F. to form principally an aldehyde product, $$C_nH_{(2n+1)}\text{—CHO}$$

containing one more carbon atom than the precursor olefin, which is then
(b) further reacted with hydrogen in the presence of an active hydrogenation catalyst at pressures of about 700 p.s.i. $H_2$ and temperatures of about 285–355° F. to reduce the aldehyde product to the corresponding alcohols, $C_{(n+1)}H_{(2n+3)}OH$.

In current petrochemical processing of olefins to OXO alcohols narrow boiling range fractions of selected olefins are used rather than single olefinic entities. Thus, when charging $C_6$ to $C_8$ olefins to the process, $C_7$ to $C_9$ alcohols will be obtained, consisting of isomeric primary alcohols depending upon the structure of the olefin, the position of the olefinic double bond in the molecule and the positioning of the CO in its addition to one of the two carbons of the olefinic double bond.

The "alcohol" product as formed in the OXO process, however, is not solely alcoholic, but rather is a mixture consisting predominantly of alcohols but containing appreciable quantities, of as much as 15 to 30% by weight, of alcohol derivatives. For example, due to the reaction of the first formed aldehydes with alcohols formed in the second phase of the process, hemiacetals and acetals are formed which persist in the reaction product. Furthermore, some of the aldehyde product formed in the first stage of the process can apparently undergo a Canizzaro type reaction whereby the related acids and alcohols (and esters) are formed.

This OXO "alcohol" mixture from the reactor is distilled to recover the selected boiling range octanols, nonanols and decanols, which are the principal $C_8$ to $C_{10}$ primary alcohols of commerce. However, from 5 to 15 weight percent of the crude OXO alcohols charged to distillation are recovered as high boiling distillation bottoms. This product as obtained in various commercial OXO units from $C_8$ to $C_{10}$ alcohols has been found to consist of a mixture having a typical composition of about—

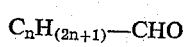

| | Percent by weight |
|---|---|
| $C_{14}$–$C_{18}$ alcohols, average $C_{16}$ | 50 |
| $C_{22}$–$C_{26}$ acetals, average $C_{24}$ | 19 |
| $C_{20}$–$C_{24}$ esters, average $C_{22}$ | 15 |
| $C_{14}$–$C_{18}$ ethers, average $C_{16}$ | 17 |

Sp. gravity, 0.845–0.865.
Acidity, 0–1% (as HOAc).
Hydroxyl number, 160–260.
Mol. weight, 265–275.

Such a bottoms fraction obtained principally as a byproduct of a large scale chemical process is available in large volume and at low cost. In present day OXO plant installations producing principally $C_8$ to $C_{10}$ alcohols and having a capacity of approximately 300,000,000 pounds of OXO alcohols per year, about 6,000,000 gallons or about 50,000,000 pounds of OXO bottoms are produced simultaneously.

Therefore, the principal object of the present invention is the preparation of cellular urethane polymers utilizing substantial quantities of OXO bottoms in their formulation.

Another object of the present invention is the utilization of substantial volumes of OXO bottoms in polyurethane formulations as a partial replacement for higher cost alcohols and polyols used heretofore in such formulations.

A further object of the present invention is the development of polyurethane formulations incorporating a selected amount of OXO bottoms as hydroxyl containing material which formulations are significantly superior in certain important characteristics to similar formulations without OXO bottoms.

Additional objects and advantages of the present invention will appear hereinafter.

In accordance with the present invention urethane polymers prepared by the interaction of an organic compound having a plurality of isocyanate groups, a higher molecular weight organic polyol and a lower molecular weight organic hydroxy compound, are improved by employing as the lower molecular weight hydroxy compound a distillation bottoms fraction obtained in the distillation of OXO process product, which bottom fraction comprises from 5 to 15% of the total OXO reaction product, and is present in the proportion of 1 to 35 parts by weight per 100 parts of urethane formulation.

In one aspect of the invention, a species of rigid polyurethane foams having low heat conductivity and high dimensional stability on hot humid aging is prepared by reacting (a) from 1 to less than 10 parts by weight of a lower molal weight hydroxyl containing component characterized as OXO "bottoms,"
(b) 30 to 40 parts by weight of a higher molal weight polyol,
(c) 35 to 45 parts by weight of a di- or polyisocyante in the ratio of 1.0 to 1.125 g. atoms of "NCO" per g. atom of "OH,"

(d) 10 to 20 and preferably 13 to 16 parts by weight of a blowing agent, with
(e) approximately 0.4 to 2 parts and preferably 1 part by weight of a foam stabilizer together with
(f) 0.1 to 2.0 parts by weight of a metallo-organic soap and/or a tertiary amine as catalyst;

effecting simultaneous polymerization and blowing with the production of a rigid cellular urethane polymer having an initial coefficient of thermal conductivity no greater than 0.12, and a volume change on hot humid aging of less than 10%.

In another aspect of the present invention, cellular urethane polymers having distinctive toughness and resiliency, as contrasted with rigid foams, are prepared by reacting (a) from about 10 to 50 parts by weight of a generally lower molal weight hydroxy containing component characterized as OXO bottoms together with
(b) an equal or larger part of higher molal weight polyol and
(c) a di- or polyisocyanate in the ratio of 1.0 to 1.25 g. atoms of isocyanate per g. atom of hydroxyl
(d) blowing agent in 13 to 16 parts by weight, with
(e) approximately 1.0 part by weight of foam stabilizer together with
(f) up to 2.0 parts by weight of an organo-metallic soap and/or a tertiary amine as catalyst and effecting simultaneous polymerization and blowing.

The hydroxyl containing materials characterized as OXO bottoms are the distillation residues obtained on distilling the mixed OXO alcohols produced in the catalytic conversion of selected $C_7$ to $C_9$ olefinic hydrocarbons as described above. While the composition of this mixture is not fully known, it will be appreciated from the description given above that monofunctional, difunctional and possibly even higher functional compounds are present which could react accordingly with the diisocyanates and polyisocyanates in the polyurethane formulation. Thus, aldehydes (acetals), ketones (ketals) and certain esters and ethers might act difunctionally with diisocyanates in cross linking and chain extending reactions. On the other hand, simple monohydric components of the bottoms mixture would react with diisocyanates or polyisocyanates to form polymer "grafts" or side chains. It has been recognized that by "grafting" organic groups on a linear polymer the physical properties of the polymer can be modified.

While OXO bottoms are preferred as the low cost hydroxyl containing residual material for urethane polymer formation, compositions from whatever source consisting of higher alcohols, acetals, esters, ethers, and the like having substantially the composition of OXO bottoms can be used effectively in the process of the invention.

Polyurethane rigid foam formulations having outstanding dimensional stability were prepared in which from 1 to up to 10 parts by weight of the total composition consisted of OXO bottoms. In small hand mixed batches it was observed that these mixtures reacted well, generally going to a creamy state in less than 30 seconds and rising smoothly over a period of 30 to 180 seconds with the polymer surface in tack free condition in 180 to 300 seconds or less. Cross sections of the cellular product in most cases showed evenly distributed fine cell structure with 90% or more of closed cells and from 50 to 65 individual cells per inch of cross section.

EXAMPLE I

A hand mixed Freon blown rigid foam was prepared employing typical OXO bottoms from the distillation of $C_8$–$C_{10}$ crude OXO alcohols as a replacement for part of the polyol prepolymer. The concentration of the lower molecular weight OXO bottoms was 7 parts by weight per 36 parts by weight of higher molecular weight polyether polyol (Atlas G2410),[1] to 38 parts by weight of crude T.D.I. (Nacconate 4040) (1.05 NCO/1.0 OH), 1.2 parts by weight of silicone foam stabilizer (Carbide L520) [2] and 16 parts by weight of Freon blowing agent (F11)[3] with 0.4 part of dimethyl ethanol amine and 0.2 part of dibutyl tin dilaurate as catalysts dissolved in 1.2 parts of a higher polyol (CP3500).[4] The mixture foamed in a normal manner, producing an evenly textured rigid foam with no apparent adverse effect due to the "bottoms" used. Tests on this product showed:

Initial thermal cond. _____ 0.12 B.t.u./hr./° F./ft.$^2$/in.
Density _____ 1.65 lb./ft.$^2$.
Compressive strength _____ 25 lb./in.$^2$.

The low thermal conductivity indicated that the closed cell nature of typical rigid foams had not been altered by incorporating OXO bottoms. Also the compressive strength was good, considering the low density of the foam prepared. All of the bottoms appeared to have been chemically bound in the polymer, since there was no residual odor in the finished rigid foam. It is noteworthy also that OXO bottoms are fully compatible with the polyol, isocyanate, blowing agent and catalyst in the system, and, further, that the added OXO bottoms reduce the viscosity of the polyol, resulting in better mixing of ingredients and a more uniformly foamed product.

A number of additional hand mixed foams were made using higher concentrations of OXO bottoms with commercially available polyols, organo-tin catalysts and diisocyanates. These products were recognized as being distinctly tough and flexible.

EXAMPLE II 15.0 parts by weight of lower molal weight OXO bottoms were dissolved in
21.3 parts by weight of higher molal weight polyol (G2566) [5]
0.7 part by weight of silicone foam stabilizer,
1.2 parts by weight of dibutyl tin dilaurate, and
17.0 parts of Freon-type blowing agent, trifluorochloromethane.

To this mix was added 45.0 parts by weight of crude TDI.

On mixing, the formulation creamed readily, rose evenly for 2.12 minutes and was tack-free in 2.83 minutes. The foamed product had risen to the full height of an 8.5 inch tub. After an oven cure of 1 hour at 250° F. the product was a very smooth, even textured flexible foam, which showed no shrinkage on curing. The skin texture was particularly noted as having a resilient tough feel. In this formulation the OXO bottoms constituted 15 wt. percent of the initial formulation, or 18.1 wt. percent of the blow finished product and 42 wt. percent of the total hydroxyl component.

EXAMPLE III

In a similar manner as in Example II, 20 parts of OXO bottoms to 22 parts of polyether polyols were used with 40 parts of TDI in a resilient foam formulation. The foam rose to maximum height in 2.3 min., polymerized to a near tack-free condition in 4 minutes and showed little shrinkage on curing one hour at 250° F. The product was noted as spongy, resilient, but having a tough skin.

---
[1] Sorbitol-propylene oxide adduct, 2410 mol. wt., 490 "OH" number.
[2] L520—alkyl silane polysiloxane polyoxyalkylene copolymer.
[3] F11—trifluoro-chloro-methane.
[4] CP3500—glycerol-propylene oxide adduct, 3500 mol. wt., 45 "OH" number.
[5] G2566, a sorbitol, alkylene oxide polyether 600–630 "OH" number.

It was noted that when higher concentrations (>10%) of OXO bottoms were used relative to the total hydroxy component, the polymerized tack-free products tended to shrink on storage and oven curing after storage. However this characteristic was surprisingly overcome by immediately curing the polymerized tack-free foam:

EXAMPLE IV 30 parts by weight of OXO bottoms as in Example I were mixed with 100 parts by weight of polyol (triol, CP3500, a polypropylene oxide adduct of glycerine), 10 parts by weight of a Freon-type blowing agent and 4.8 parts of activator solution consisting of 0.2 part of diazabicyclooctane, 1.2 parts of silicone, L520

3.4 parts of water and 0.66 part of dibutyl tin dilaurate in 1.32 parts of the above CP3500 as a solvent in a ratio of 1 part by 2 by weight respectively.

52 parts by weight of tolylene diisocyanate were added with stirring.

The mix foamed well, rising to its maximum height in 2.66 minutes. The product was put in a 225–250° F. curing oven at once. In a one hour cure the flexible foamed product showed no shrinkage.

This improved result, whether caused by the more extensive and more rapid polymerization and stabilization of the foam at curing temperature or by other means inherent in the system, effectively demonstrates the utility of OXO bottoms at concentration levels above 10%. In Examples III and IV the OXO bottoms constituted 20 and 15 wt. percent respectively of the total urethane foam formulation and 48 and 23 wt. percent respectively of the total hydroxyl component.

Larger volume one-shot machine runs were next made on the Bayer-Hennecke foam machine using 0, 5 and 10% by weight of OXO bottoms in the formulation. The foam formulations containing OXO bottoms behaved normally on the machine, producing well blown, evenly cellular rigid foams. The formulation, foaming and product properties in typical machine runs are shown in the following examples:

EXAMPLES

| Parts by wt.* | V | VI | VII |
| --- | --- | --- | --- |
| OXO bottoms | 0 | 5 | 10 |
| Polyol, G2410 | 41.3 | 38.5 | 34.0 |
| Freon-F11 | 13.4 | 14.9 | 15.2 |
| Silicone, L520 | 0.7 | 0.7 | 0.7 |
| Nacconate 4040 | 43 | 39.4 | 37.5 |
| Catalyst: | | | |
| DMEA | 0.4 | 0.4 | 0.6 |
| DBTDL | 0.2 | 0.2 | 0.3 |
| In CP3500 | 0.6 | 1.2 | 1.2 |
| NCO/OH ratio | 1.125 | 1.064 | 1.076 |
| Rise time, sec. | 30 | 52 | 40 |
| Physical Tests on Products: | | | |
| Density, lb./ft.³ | 2.1 | 1.95 | 2.65 |
| Closed cells, percent | 95 | 95 | 91 |
| Thermal "k", initial | 0.124 | 0.115 | 0.117 |
| Thermal "k" at 14 d/140° F./dry | 0.15 | 0.16 | 0.18 |
| Dimensional Stability: | | | |
| Percent change after 24 hrs. at −20° F. | +0.4 | −0.2 | +2.3 |
| Percent change after 7 days at 158° F., 100% Humidity | +30 to +45 | +1.6 | +6.0 |

*Polyol G2410—Sorbitol-propylene oxide adduct, hydroxyl 490.
Freon-F11—Trichlorofluoro-methane.
Silicone L-520—Water soluble alkyl silane polysiloxane, polyoxyalkylene copolymers.
Nacconate 4040—Mixed crude diisocyanates, principally tolylene diisocyanate.
DBTDL—Dibutyl tin dilaurate.
DMEA—Dimethyl ethanolamine.
Voranol CP3500—Propylene oxide adduct of glycerol, 3,500 mol. wt. "OH" number.

For the production of rigid cellular polyurethanes having low density, low thermal conductivity, and excellent dimensional stability, from 1% to up to 10% by weight of OXO bottoms can be incorporated to advantage. At a preferred concentration of about 5% by weight, OXO bottoms contribute distinctly beneficial effects to the rigid cellular product. The coefficient of thermal conductivity is unexpectedly as low as or lower for the OXO-containing products than for the non-OXO formulated product. In view of the major use of rigid polyurethane foams in thermal insulation applications, the replacement of conventional polyols with OXO bottoms contributes a significant economic advantage to the foams containing OXO bottoms in view of the substantially lower cost of OXO bottoms than that of conventional polyols.

The most striking result of incorporating OXO bottoms in rigid foams was observed when rigid foam samples were submitted to aging tests under conditions of moderately high temperature (158° F.) and humidity (100%). Although the control sample swelled as much as 30 to 45%, the foam sample containing 5% of OXO bottoms swelled only 2 to 3% and the foamed product containing up to 10% of OXO bottoms showed considerably less than 10% distortion. Dimensional stability is of extreme importance in commercial applications of rigid foams, as for example, in "foamed in place" rigid foams to build up internal stability of aircraft propellers, wings and airframe sections. Thus a "standard" rigid foam made with conventional polyols would swell from 10 to 15 times as much as the corresponding product made with 5% of OXO bottoms. With the preponderance of rigid foam uses concentrated in the field of structural materials and interwall insulation, these properties of low thermal conductivity and high dimensional stability are of extreme significance.

From the above examples the use of OXO bottoms in polyurethanes falls into two categories. With from 1 up to 10%, preferably from 3 to 7%, of OXO bottoms in the formulation, rigid foams can be produced having excellent insulating properties and exceptional dimensional stability, while with from above 10% to about 35%, preferably 15 to 25% of OXO bottoms in the formulation, cellular polyurethanes are formed having a tough but flexible structure. Since each of these products has distinct commercial applications, both variants are within the general concept of the invention.

Whereas, in the foregoing description the OXO alcohols and bottoms are primarily the products of the OXO process utilizing $C_7$ to $C_9$ olefins or closely related olefinic cuts which may include $C_6$ to $C_{12}$ olefins, the OXO process in general is applicable to carbonylation and hydrogenation of lower and higher molal weight olefins with the resultant production of a broader range of alcohols and bottoms. Olefins as low as ethylene and propylene have been oxonated successfully to the corresponding propanol and butanols. The yield of desired butanols was about 85% with about 15% of the product appearing as higher boiling bottoms. Olefins even above $C_{30}$ have been oxonated to $C_{31}$ and higher wax alcohols, which were outstanding emulsifiers. Thus, the bottoms product from the OXO process may cover a considerable range of alcohols, acetals, aldehydes, esters, ethers, etc. which accompany the formation of the OXO alcohols. With similar functional groups as in the bottoms from $C_8$–$C_{10}$ alcohols, their reactivity with isocyanates in urethane formation will be similar to the bottoms product described above, but not identical in their effect in view of their lower or higher molecular weight and the correspondingly greater or lesser reactivity per unit weight of bottoms.

Similarly, combinations consisting of higher molecular weight alcohols, aldehydes, acetals, esters and ethers having substantially the composition of OXO bottoms, whether composited from separate components or obtained as a product mixture will react in the manner shown above in the formation of polyurethanes of unusual character.

Obviously, many modifications and variations of the invention as hereinbefore set forth may be made without departing from the spirit and scope thereof, and therefore only such limitations should be imposed as are indicated in the appended claims.

What is claimed is:

1. In the method of preparing cellular urethane polymers by the interaction of an organic polyisocyanate with both a polyether polyol having a molecular weight of about 2410 to about 3500 and a lower molecular weight hydroxy material, the improvement obtained by employing OXO bottoms as said lower molecular weight hydroxy material, said OXO bottoms having a molecular weight of about 265 to about 275, hydroxyl value of about 160 to about 260 and being a distillation residue containing a mixture of primarily mono-functional organic compounds consisting essentially of alcohols, esters, ethers and acetals which is obtained by the (a) oxonation of $C_6$ to $C_{12}$ olefinic hydrocarbons with carbon monoxide and hydrogen in the presence of a cobalt catalyst to form aldehydes containing one more carbon atom than the precursor olefin, (b) reduction of the oxonation product with hydrogen and an active hydrogenation catalyst and (c) distillation of the reduced reaction product, said bottoms used in the proportion of from 1 part to 35 parts by weight per 100 parts of total formulation.

2. The method of claim 1, wherein said OXO bottoms are present in the proportion of from 1 to less than 10 parts by weight per 100 parts of total formulation.

3. The method of claim 1, wherein said OXO bottoms are present in the proportion of about 15 to 35 parts by weight per 100 parts of total formulation.

4. The method as in claim 3 wherein the cellular polymer, upon attainment of maximum foam height, is subjected to a temperature of about 225 to about 250° F. to effect curing of the polymer product.

5. The method of preparing rigid polyurethane foams which consists essentially in reacting (a) a polyether polyol having a molecular weight of about 2410 to about 3500; (b) 1 to about 10 parts by weight per 100 parts of total formulation of OXO bottoms, said OXO bottoms having a molecular weight of about 265 to about 275, a hydroxyl value of about 160 to about 260 and being a distillation residue containing a mixture of primarily mono-functional organic compounds consisting essentially of alcohols, esters, ethers and acetals which is obtained by the (1) oxonation of $C_6$ to $C_{12}$ olefinic hydrocarbons with carbon monoxide and hydrogen in the presence of cobalt catalyst to form aldehydes containing one more carbon atom than the precursor olefin, (2) reduction of the oxonation product with hydrogen and an active hydrogenation catalyst and (3) distillation of the reduced reaction product; (c) an organic diisocyanate in the ratio of 1.0 to 1.125 gram atoms of isocyanate per gram atom of hydroxyl; (d) a blowing agent; (e) a foam stabilizer and (f) a catalyst; and effecting simultaneous polymerization and blowing.

6. The method of claim 5 wherein OXO bottoms are present in the ratio of about 3 to 7 parts by weight per 100 parts of total formulation.

7. The method of preparing resilient cellular polyurethane foams which consists essentially in reacting (a) a polyether polyol having a molecular weight of about 2410 to about 3500 ; (b) about 10 to 35 parts by weight per 100 parts of total formulation of OXO bottoms, said OXO bottoms having a molecular weight of about 265 to about 275, a hydroxyl value of about 160 to about 260 and being a distillation residue containing a mixture of primarily mono-functional organic compounds consisting essentially of alcohols, esters, ethers and acetals which is obtained by the (1) oxonation of $C_6$ to $C_{12}$ olefinic hydrocarbons with carbon monoxide and hydrogen in the presence of a cobalt catalyst to form aldehydes containing one or more carbon atoms than the precursor olefin, (2) reduction of the oxonation product with hydrogen and an active hydrogenation catalyst and (3) distillation of the reduced reaction product; (c) an organic diisocyanate; (d) a blowing agent; (e) a foam stabilizer and (f) a catalyst; and effecting simultaneous polymerization and blowing.

8. The method of claim 7 wherein OXO bottoms are present in a ratio of about 15 to 25 parts by weight per 100 parts of total formulation.

9. Polyurethane foam prepared by reacting from 1 to 35 parts by weight of OXO bottoms, said OXO bottoms having a molecular weight of about 265 to about 275, a hydroxyl value of about 160 to about 260 and being a distillation residue containing a mixture of primarily mono-functional organic compounds consisting essentially of alcohols, esters, ethers and acetals which is obtained by the (a) oxonation of $C_6$ to $C_{12}$ olefinic hydrocarbons with carbon monoxide and hydrogen in the presence of a cobalt catalyst to form aldehydes containing one more carbon atom than the precursor olefin, (b) reduction of the oxonation product with hydrogen and an active hydrogenation catalyst and (c) distillation of the reduced reaction product; a polyether polyol having a molecular weight of about 2410 to about 3500; a blowing agent; a foam stabilizer; and a catalyst selected from the group consisting of metal soaps and tertiary amine, together with an active organic diisocyanate in the ratio of 1.0 to 1.125 gram atoms of isocyanate per gram atom of hydroxyl.

References Cited
UNITED STATES PATENTS

| | | | |
|---|---|---|---|
| 2,801,971 | 8/1957 | Bartlett et al. | 260—604 |
| 2,839,478 | 6/1958 | Wilms et al. | 260—2.5 |
| 2,842,514 | 7/1958 | Bartlett et al. | 260—604 |
| 2,945,050 | 7/1960 | Franke et al. | 260—604 |
| 3,202,620 | 8/1965 | Merten et al. | 260—2.5 |

DONALD E. CZAJA, Primary Examiner.

LEON J. BERCOVITZ, J. J. KLOCKO,
Assistant Examiners.